United States Patent

Tamai et al.

(10) Patent No.: US 10,045,898 B2
(45) Date of Patent: Aug. 14, 2018

(54) ROBOT

(71) Applicant: MUSCLE CORPORATION, Osaka-shi, Osaka (JP)

(72) Inventors: Hirofumi Tamai, Osaka (JP); Satoshi Tamai, Osaka (JP)

(73) Assignee: MUSCLE CORPORATION, Osaka (JP)

(*) Notice: Subject to any disclaimer, the term of this patent is extended or adjusted under 35 U.S.C. 154(b) by 249 days.

(21) Appl. No.: 15/021,721

(22) PCT Filed: Mar. 14, 2014

(86) PCT No.: PCT/JP2014/057950
§ 371 (c)(1),
(2) Date: Mar. 14, 2016

(87) PCT Pub. No.: WO2015/056460
PCT Pub. Date: Apr. 23, 2015

(65) Prior Publication Data
US 2016/0228314 A1  Aug. 11, 2016

(30) Foreign Application Priority Data

Oct. 18, 2013 (JP) .................. 2013-216861
Dec. 13, 2013 (JP) .................. 2013-258661

(51) Int. Cl.
A61G 7/10 (2006.01)
B25J 5/00 (2006.01)
B25J 11/00 (2006.01)

(52) U.S. Cl.
CPC .......... A61G 7/1019 (2013.01); A61G 7/1017 (2013.01); A61G 7/1046 (2013.01); B25J 5/007 (2013.01); B25J 11/009 (2013.01)

(58) Field of Classification Search
CPC .. A61G 7/1017; A61G 7/1019; A61G 7/1046; B25J 5/007; B25J 11/009
See application file for complete search history.

(56) References Cited

U.S. PATENT DOCUMENTS 4,947,497 A * 8/1990 Marchand ............ A61G 7/1019
5/86.1
7,861,336 B2 * 1/2011 Patterson ............. A61G 7/1019
5/81.1 C
(Continued)

FOREIGN PATENT DOCUMENTS

JP  2002136549 A   5/2002
JP  2010-536417 A  12/2010
(Continued)

OTHER PUBLICATIONS

International Search Report for International Application No. PCT/JP2014/057950.

Primary Examiner — Timothy R Waggoner
(74) Attorney, Agent, or Firm — Lucas & Mercanti, LLP

(57) ABSTRACT

Provided is a robot which is easily operated and with which it is possible for a caregiver to transfer a person alone. A robot (R) provided with a traveling unit (M1), a hoisting unit (M2) provided to the traveling unit (M1), a tilting unit (M3) provided to the hoisting unit (M3), an operating unit (M4) provided to the tilting unit (M3), and a pair of arms, wherein: the tiling unit (M3) has a main tilting unit and an auxiliary tilting unit provided to the main tilting unit; and the auxiliary tilting unit has auxiliary tilting members which are provided to both ends of the main tilting member on the main tilting unit, holds the arms, and can rotate freely.

17 Claims, 16 Drawing Sheets

(56) References Cited

U.S. PATENT DOCUMENTS

| | | | | |
|---|---|---|---|---|
| 8,336,133 B2* | 12/2012 | Palay | ............ | A61G 5/14 |
| | | | | 5/81.1 R |
| 2015/0173988 A1* | 6/2015 | Tamai | ............ | A61G 7/1025 |
| | | | | 700/245 |
| 2015/0182403 A1* | 7/2015 | Lim | ............ | A61G 7/1025 |
| | | | | 5/86.1 |

FOREIGN PATENT DOCUMENTS

| JP | 2011-172898 A | 9/2011 |
|---|---|---|
| WO | 2009147832 A1 | 10/2009 |

\* cited by examiner

F I G. 1
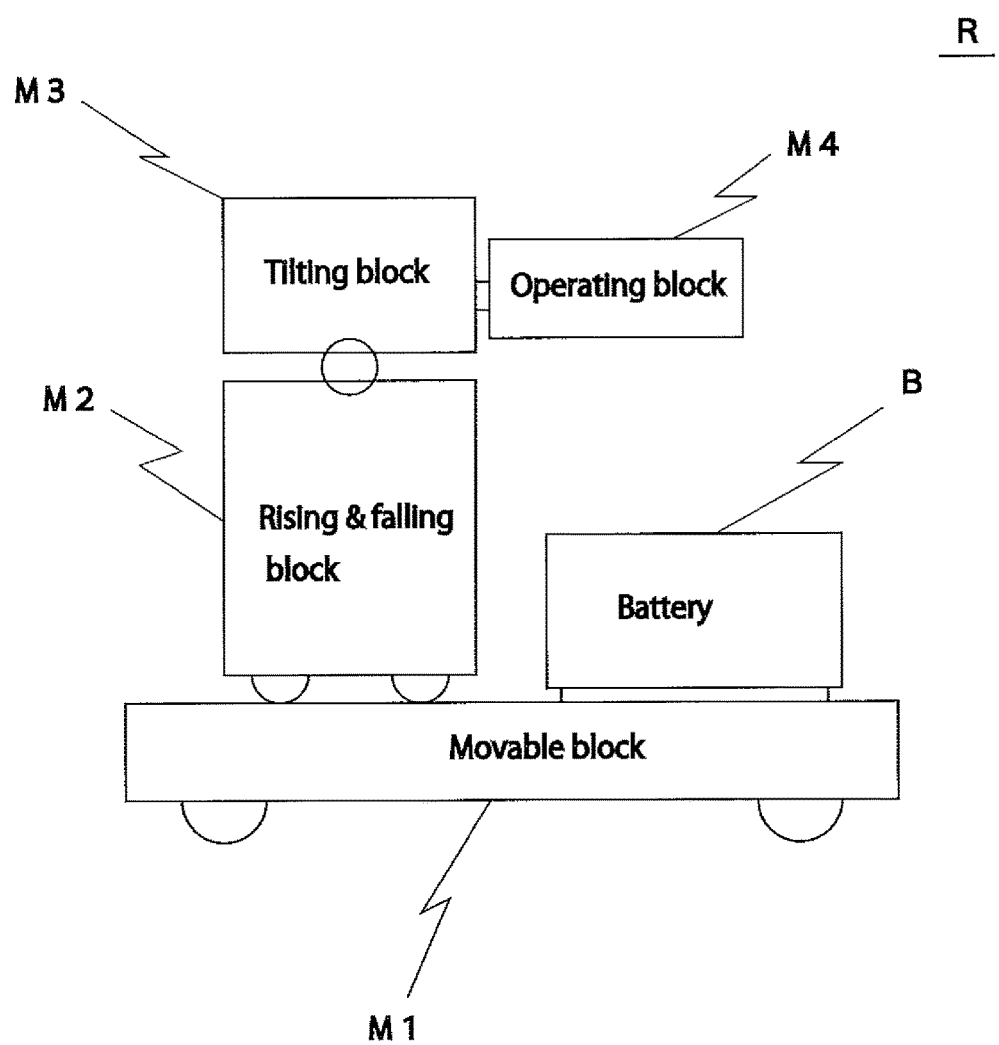

(a)

(b)

(c)

(a)
                                              60

(b)
                                              60

ROBOT

CROSS-REFERENCE TO RELATED APPLICATIONS

This application is a 371 of PCT/JP2014/057950 filed on Mar. 14, 2014, which in turn claims the priority of JP 2013-216861 filed on Oct. 18, 2013 and JP 2013-258661 filed on Dec. 13, 2013, the priority of both applications are hereby claimed and all applications are incorporated by reference herein.

TECHNICAL FIELD OF THE INVENTION

The present invention is related to a robot. More specifically, the present invention is mainly related to a robot which is able to reduce burden of caregivers at a time of transferring care receivers.

BACKGROUND ART

Up to now, life support for aged persons and physically handicapped persons (hereinafter, referred to as care receivers) is carried out by caregivers such as care helpers. In the life support for care receivers by caregivers such as care helpers, the care receivers are transferred to wheelchairs from beds or to beds from wheelchairs to go to a restroom or to take a bath.

Since such transfer is usually carried out by one caregiver such as care helper alone, the caregiver is resultantly loaded heavy burden. Therefore, most of caregivers such as care helpers suffer from lower back pain. As a result, such lower back pain has been one of the occupational disorders.

For this reason, the care receiver is transferred by two caregivers now. However, due to rapid graying population of Japan, it becomes difficult to get enough caregivers such as care helpers. Accordingly, the persons related to the care business, it is anticipated that a care-robot to reduce number of caregivers such as care helpers at the time of transferring care receivers.

The patent document No. 1 discloses a carrier used in care. However, the carrier has a complex construction, so that the carrier cannot handle easily.

PRIOR DOCUMENT

Patent Document

Patent document No. 1: Japanese Laid-open patent publication 2002-136549

SUMMARY OF THE INVENTION

Problem to be Solved by the Invention

Considering the problem of the prior art, the purpose of the present invention is to provide a robot which is operated easily and is able to transfer a care receiver by one caregiver alone.

Means to Solve the Problem

The robot of the present invention comprises a movable block, a rising & falling block arranged on the movable block, a tilting block set to the rising & falling block, an operating block arranged on the tilting block and a pair of arms; wherein the tilting block has a main tilting part and an auxiliary tilting part arranged on the main tilting block; and the auxiliary tilting part has auxiliary tilting elements, holding the arms, rotatably set at the both ends of a main tilting element of the main tilting part respectively.

In the robot of the present invention, it is preferable that the main tilting part has a planetary gear mechanism including a sun gear and a pair of planetary gears arranged symmetrically to the sun gear; wherein the sun gear is supported by the top of the central rising & falling shaft of the rising & falling block and the main tilting element of the main tilting part in condition that the sun gear is unable to be rotated; one of the planetary gears is supported by the top of the one-side rising & falling shaft, which is set at one side of the central rising & falling shaft tiltably set on the base and at one side of the main tilting element of the main tilting part, in condition that the planetary gear is able to be rotated; and the other of the planetary gears is supported by the top of the other-side rising & falling shaft, which is set at the other side of the central rising & falling shaft tiltably set on the base and at the other side of the main tilting element of the main tilting part, in condition that the planetary gear is able to be rotated.

Also, in the robot of the present invention, it is preferable that the rising & falling block has a pair of rising & falling shafts; wherein the main tilting element is tilted by the rising & falling shafts.

Also, in the robot of the present invention, it is preferable that the auxiliary tilting element of the auxiliary tilting part is tilted by the rotating force of the planetary gear through a force transmitting mechanism arranged in the main tilting element.

Also, in the robot of the present invention, it is preferable that the auxiliary tilting element is rotated in the same direction as the tilting direction of the main tilting element.

Also, in the robot of the present invention, it is preferable that the arm is solid or hollow cylinder.

Also, in the robot of the present invention, it is preferable that the arm is supported by the auxiliary tilting element in condition that the arm is able to be moved forward and backward.

Also, in the robot of the present invention, it is preferable that the auxiliary tilting element has a locking mechanism which locks the arm at a prescribed position.

Also, in the robot of the present invention, it is preferable that the robot is covered with a decorative cover.

Also, in the robot of the present invention, it is preferable that the operating block has operating levers, an operating panel, and a control device; wherein the operating levers have actuating command means generating actuating command for the rising & falling block.

Also, in the robot of the present invention, it is preferable that the operating panel has a head position indicating means indicating position of a head, and a head position indicating display displaying position of the head in response to an indicating signal from the head position indicating means.

Also, in the robot of the present invention, it is preferable that the control device has a signal input block, an input signal managing block, an arithmetic processing block, a driving command generation block and a signal output block; wherein the arithmetic processing block has a tilting processing section which has tilting command generation means and a limit processing means.

Also, in the robot of the present invention, it is preferable that the input signal managing block has a polarity discriminating means discriminating the polarity of the actuating command, a comparing means comparing the amplitude of the actuating command and a head position discriminating means discriminating head position based on a signal from the head position indicating means.

Also, in the robot of the present invention, it is preferable that the comparing means selects a smaller absolute value of the input signal.

Also, in the robot of the present invention, it is preferable that the limit processing means calculates the tilting angle based on the acceleration.

Effect of the Invention

The present invention is comprised as described above, so that one caregiver is able to move a care receiver from bed alone.

BRIEF DESCRIPTION OF DRAWINGS

FIG. 1 is a functional block diagram of one embodiment of the present invention.

EMBODIMENTS CARRYING-OUT THE INVENTION

Hereinafter referring to the attached drawings, the present invention is described on the basis of embodiments. However, the present invention is not limited to the embodiments.

Figure 2:
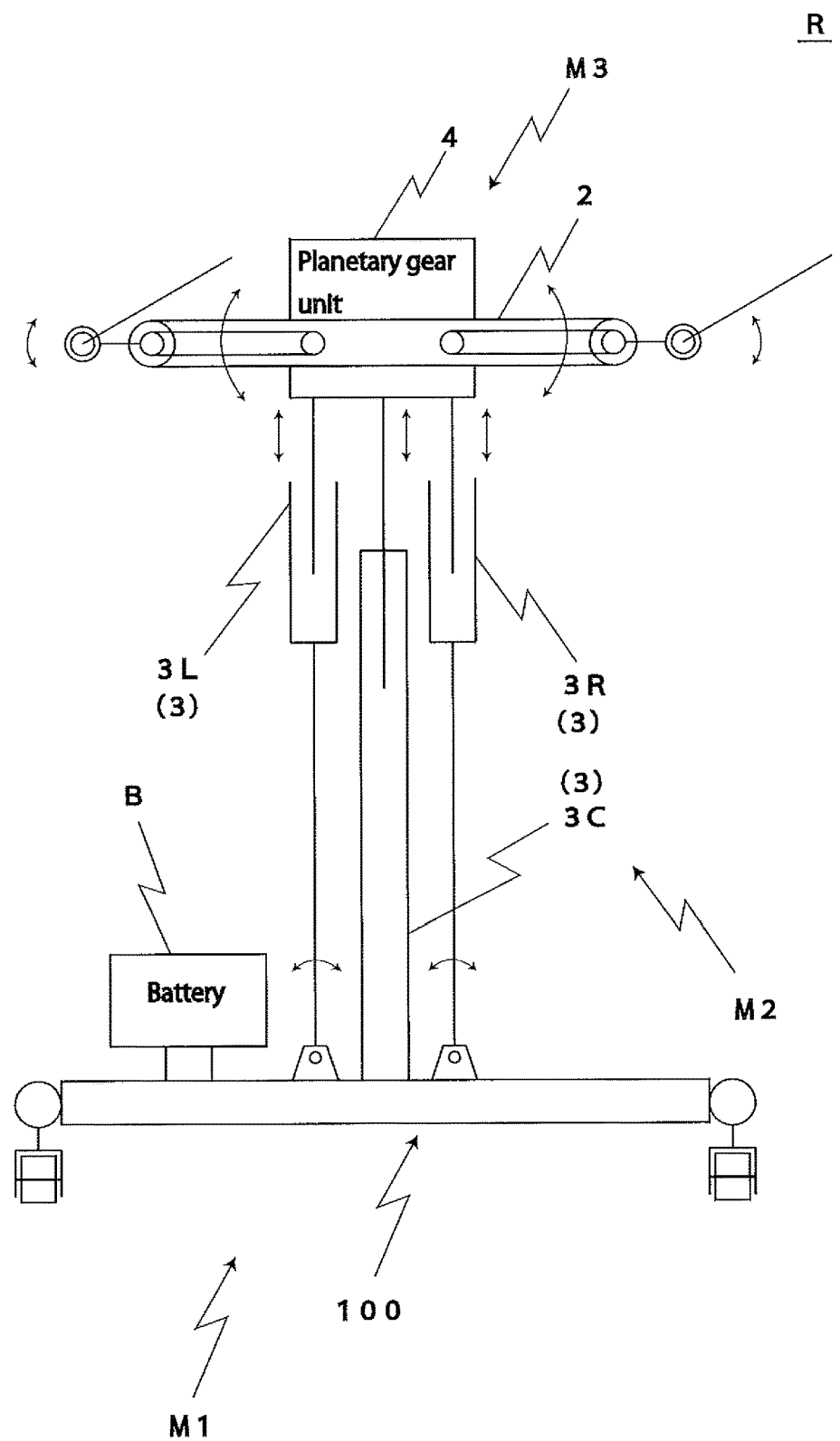
FIG. 2 is a schematic drawing of the robot.
Figure 3:
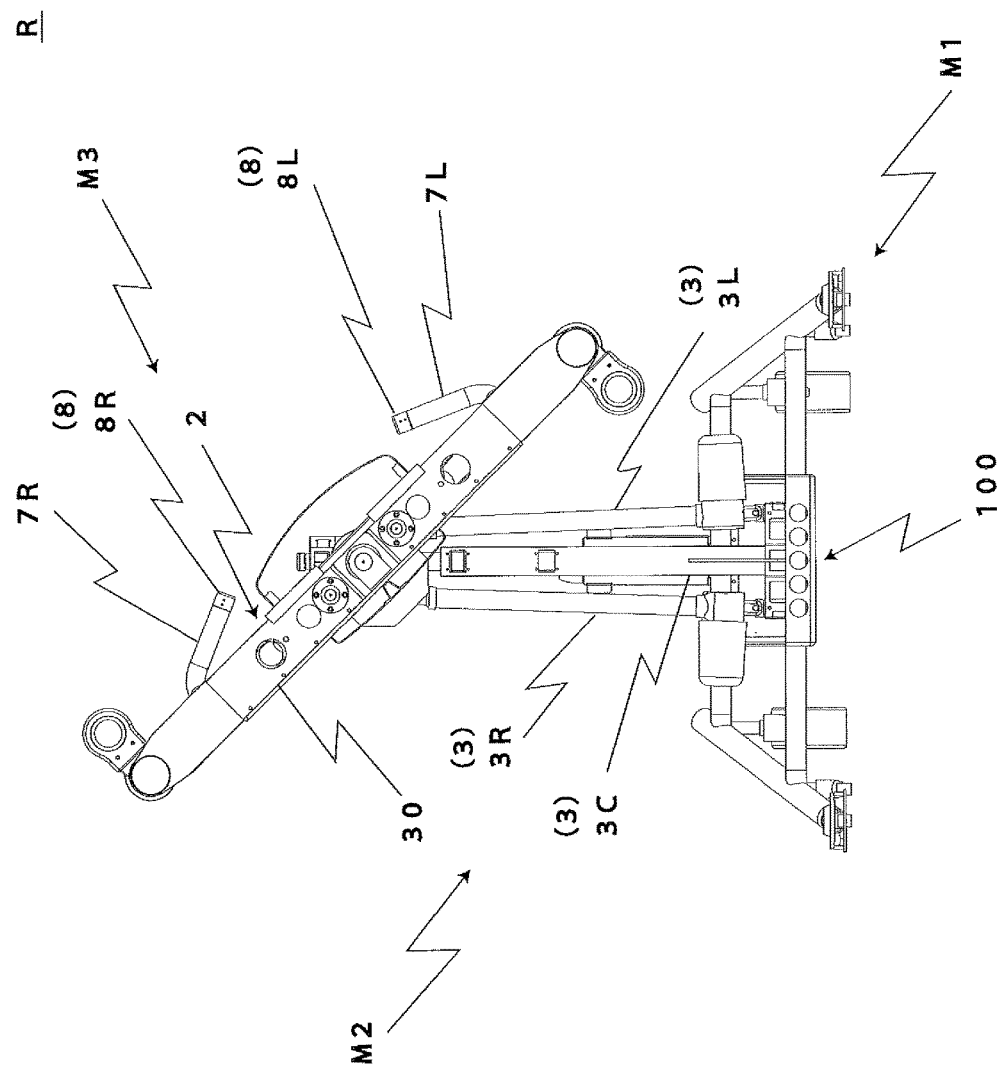
FIG. 3 is a schematic drawing showing the tilting block is tilted.
Figure 4:
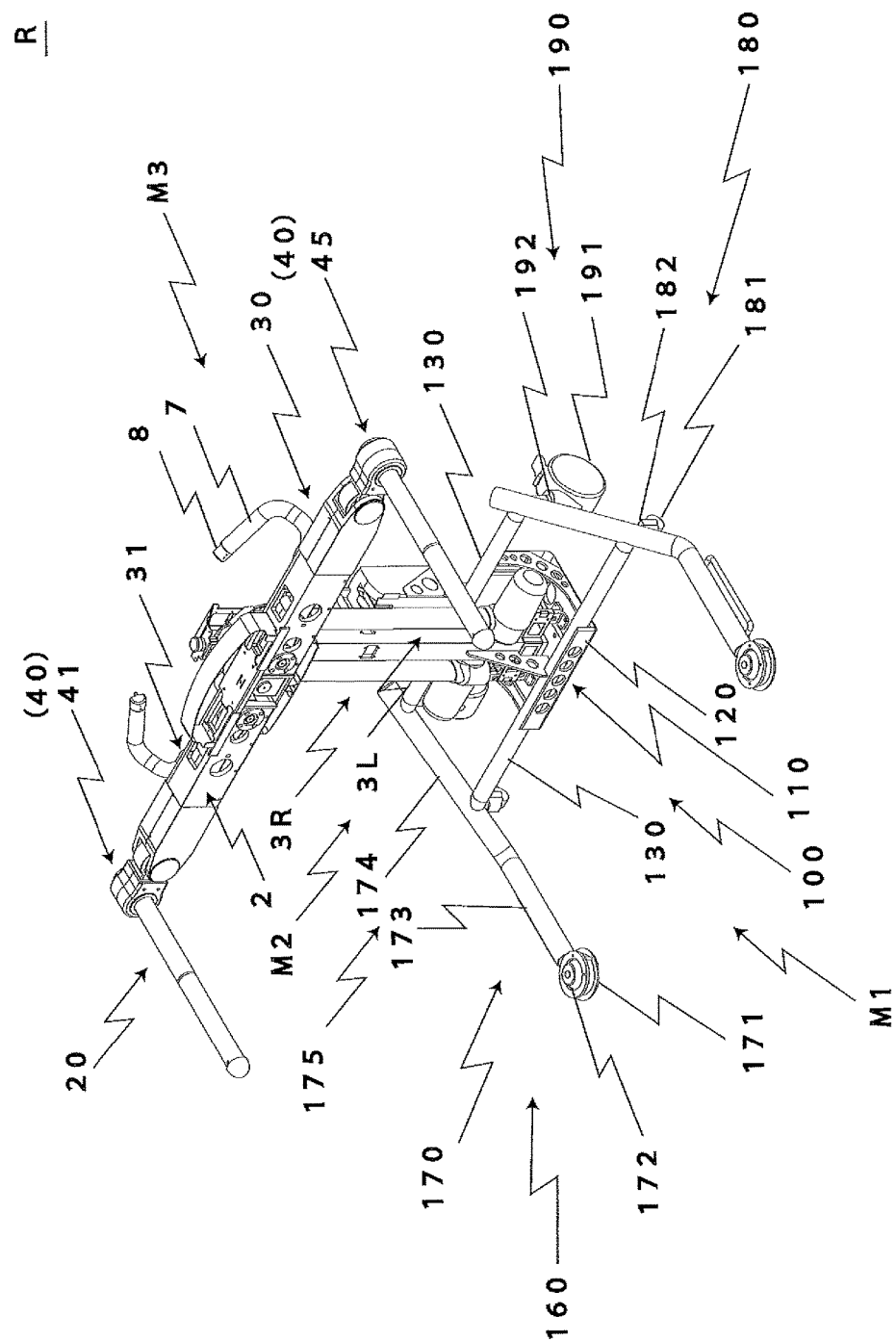
FIG. 4 is a perspective view of the robot.
Figure 5:
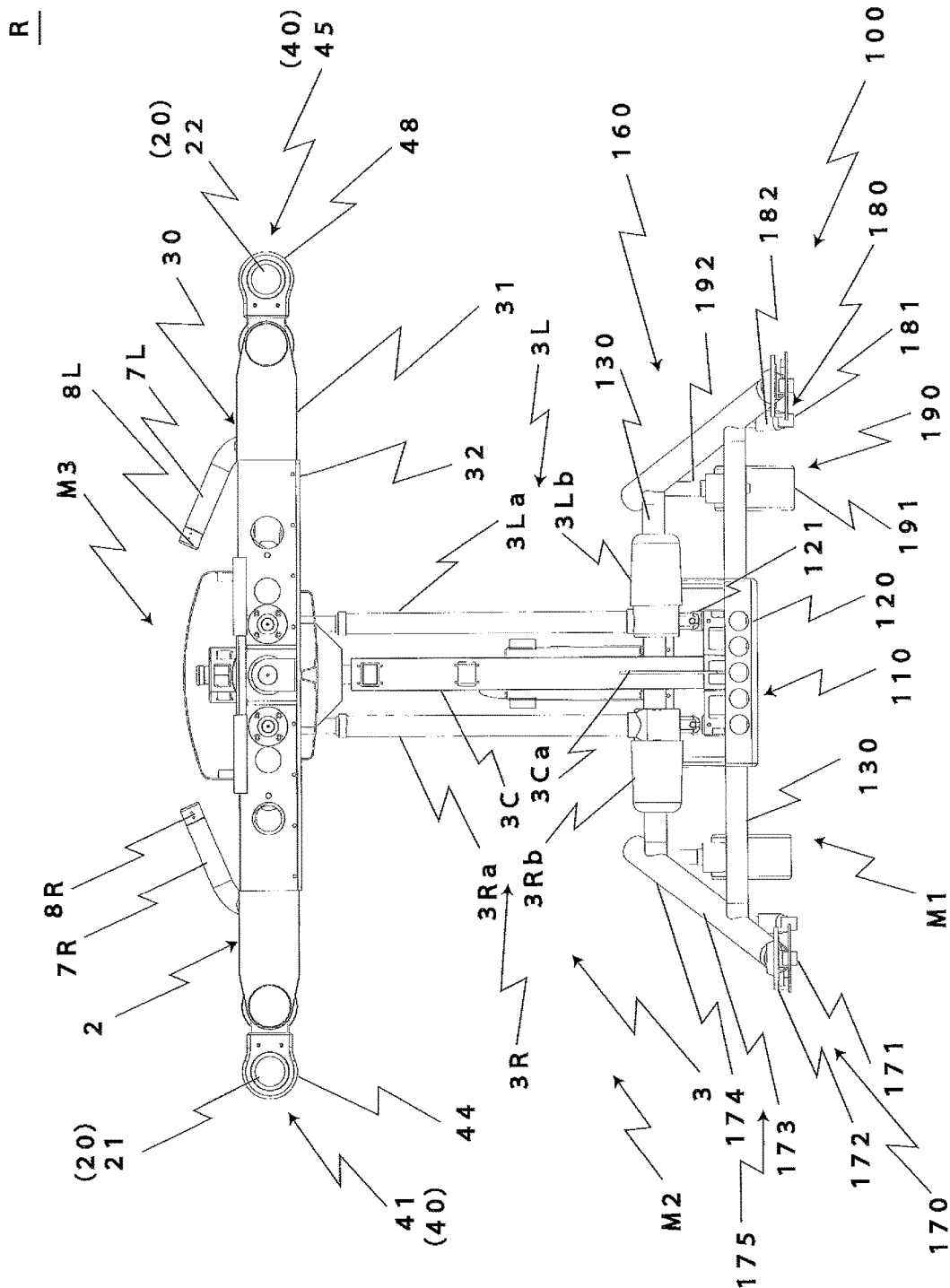
FIG. 5 is a front view of the robot.
Figure 6:
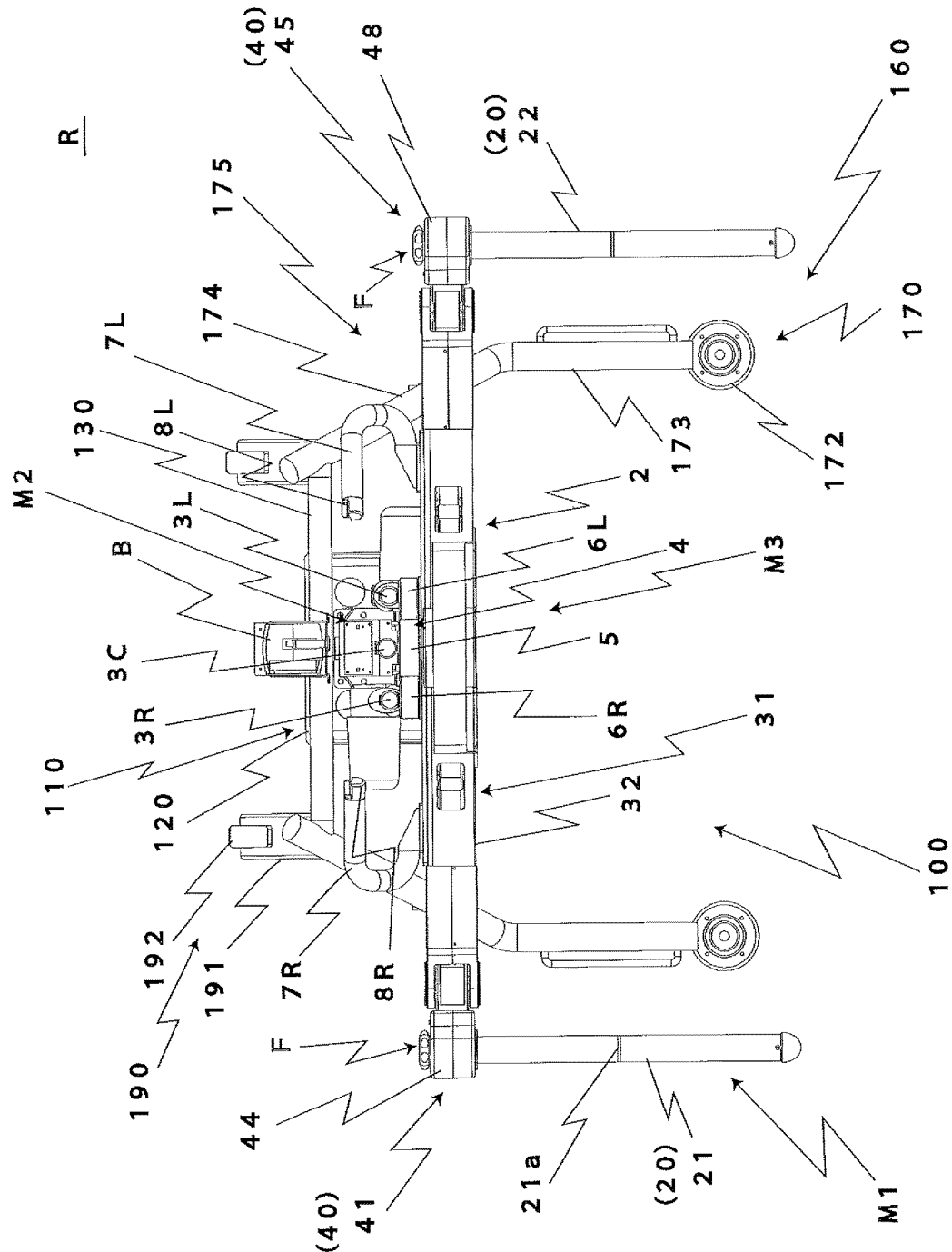
FIG. 6 is a plan view of the robot.
Figure 7:
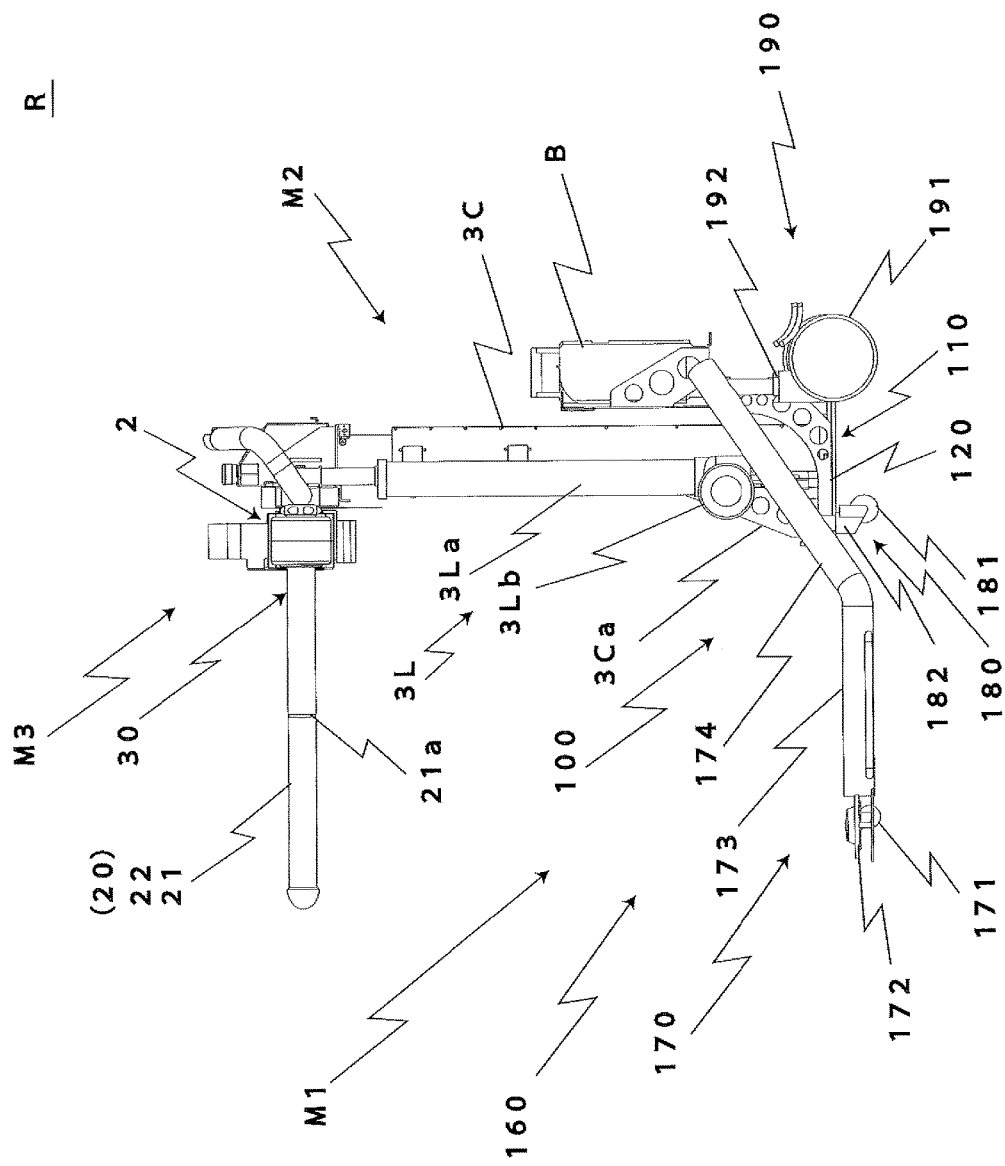
FIG. 7 is a side view of the robot.

FIG. 1 shows a functional block diagram of a robot R, FIG. 2 shows a schematic drawing of the robot R, and FIG. 3 shows a tilting block in condition that the tilting block is tilted. Hereinafter, the right-side and the left-side mean the right-side and the left-side of the robot in case of viewing the robot R from the rear thereof respectively.

As shown in FIG. 1, the robot R comprises a movable block M1, a rising & falling block M2 arranged on the movable block M1, a tilting block M3 set to the rising & falling block M2, and an operating block M4 arranged on the tilting block M3 as main components.

More concretely, as shown in FIG. 2 and FIG. 3, the robot R has a base 100, movably constructed, composing the movable block M1, and a rising & falling shaft 3, arranged on the base 100 and composing the rising & falling block M2, tilting the tilting block M3 and rising and falling the tilting block M3. Also, the base 100 is equipped with a battery B. The battery B supplies the operating block M4, the rising & falling block M2, and the tilting block M3 with electric power.

The rising & falling shaft 3 includes a central rising & falling shaft 3C arranged at the center of the base 100, a right-side rising & falling shaft 3R near-by arranged at the right-side of the central rising & falling shaft 3C, and a left-side rising & falling shaft 3L near-by arranged at the left-side of the central rising & falling shaft 3C. Herein, the right-side rising & falling shaft 3R and the left-side rising & falling shaft 3L are driving shaft, and the central rising & falling shaft 3C is driven shaft driven by the right-side rising & falling shaft 3R and the left-side rising & falling shaft 3L. Also, the driving shafts are screw shafts so that the shafts are able to hold their position when the shafts are stopped, and the shafts have internal sensors (not shown) at the upper limit and the lower limit thereof so that the shafts are automatically stopped at the upper limit and the lower limit thereof respectively.

Tilting of the tilting block M3 is carried out by tilting a tilting element 2 of the tilting block M3 with a tilting mechanism composed of a planetary gear unit 4, as a central component, comprising a sun gear arranged at the top of the central rising & falling shaft 3C, a right-side planetary gear arranged at the top of the right-side rising & falling shaft 3R and a left-side planetary gear arranged at the top of the left-side rising & falling shaft 3L Rising and falling of the tilting block M3 is carried out by rising and falling the tilting element 2 of the tilting block M3 with rising and falling the right-side rising & falling shaft 3R and the left-side rising & falling shaft 3L synchronously. Detail of the planetary gear unit 4 is described later.

In this embodiment, the movement range of the tilting block M3 by the rising & falling shaft 3 is restricted in the range of 750 mm to 1150 mm, and tilting angle of the head-side of the tilting block M3 is restricted in the range of +45 degrees to 0 degrees. However, the movement range and the tilting angle are not limited to the above-described range. For example, the tilting angle is able to be freely selected not to exceed +90 degrees.

Hereinafter, referring additionally to FIG. 4 to FIG. 8, a mechanical construction of the robot R of the embodiment is described in detail.

The robot R includes the base 100 movably constructed, the rising & falling block M2 arranged on the base 100, and the tilting block M3 set to the rising & falling block M2. The tilting element 2 of the tilting block M3 is equipped with a pair of arm elements 20, 20 at the both ends thereof. Namely, the right-side end thereof is equipped with a right-side arm element 21, and the left-side end thereof is equipped with a left-side arm element 22.

The base 100 includes a carrying block 110 arranged on the center of the base 100, and moving mechanisms 160 set at the both sides of the carrying block 110. The carrying block 110 includes a carrying element 120 arranged at the center of the carrying block 110, and a horizontal support element 130 supporting the carrying element 120 elongated right and left directions.

The carrying block 110, more concretely, the carrying element 120 is equipped with the rising & falling block M2 and so on.

The moving mechanism 160 includes a front moving mechanism 170, a middle moving mechanism 180 and a rear moving mechanism 190. The front moving mechanism 170 includes front wheels 171 and front wheel support elements 172. The front wheel support element 172 is set to the front end of a front wheel support element holding element 175 including a front horizontal part 173 and a rear upslope part 174. More concretely, the front wheel support element 172 is set to the front end of the front horizontal part 173.

The middle moving mechanism 180 includes middle wheels 181 and middle wheel support elements 182. The rear moving mechanism 190 includes rear wheels 191 and rear wheel support elements 192.

The front wheel support element holding elements 175, the middle wheel support elements 182 and the rear wheel support elements 192 are connected to the horizontal support element 130 by suitable means respectively. Herein, the diameter of the front wheel 171 and the diameter of the middle wheel 181 are smaller than that of the rear wheel 191, and the diameter of the front wheel 171 is smaller than that of the middle wheel 181.

The diameter of the front wheel 171 is small, and the front wheel support element holding element 175 has the above-described construction, so that the front moving mechanism 170 is able to get under a bed.

The tilting block M3 comprises the tilting element 2, including a main tilting part 30 having a main tilting element 31, and an auxiliary tilting part 40. The main tilting part 30 is constructed by the planetary gear unit 4 as a central component. The planetary gear unit 4 includes the non-movable sun gear 5, and the right-side planetary gear 6R and the left-side planetary gear 6L symmetrically arranged to the sun gear 5. The auxiliary tilting part 40 includes a right-side auxiliary tilting section 41 having a right-side timing belt mechanism 42 driven by the right-side planetary gear 6R, and a left-side auxiliary tilting section 45 having a left-side timing belt mechanism 46 driven by the left-side planetary gear 6L.

Figure 8:
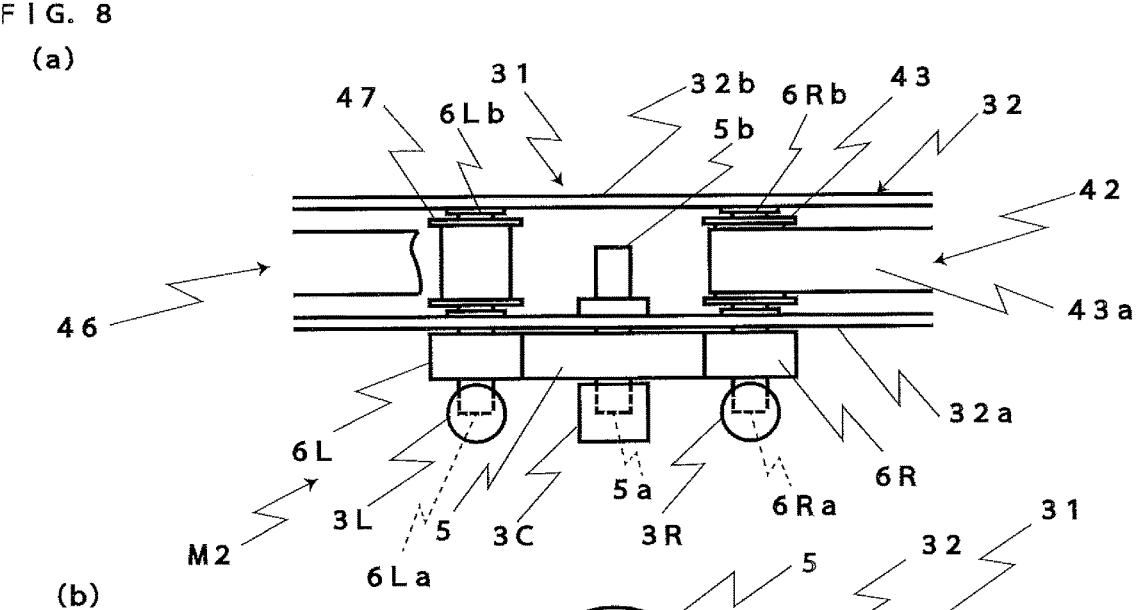
FIG. 8 is a schematic drawing of the main part of the tilting block of the robot.
Figure 8:
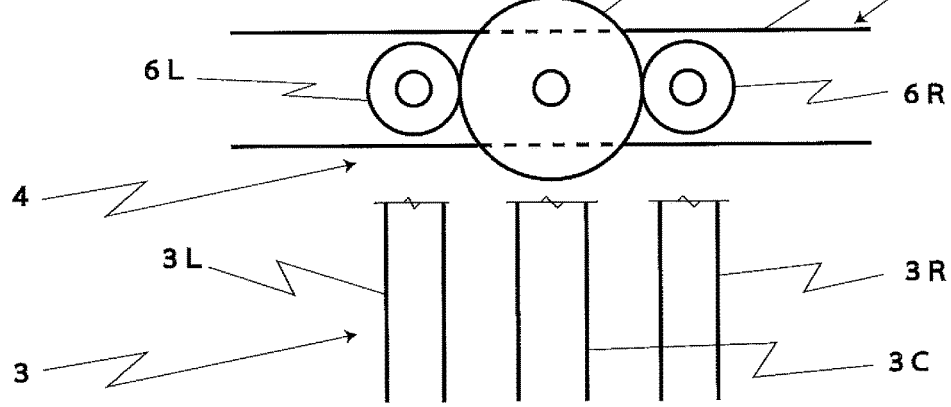
Figure 8:
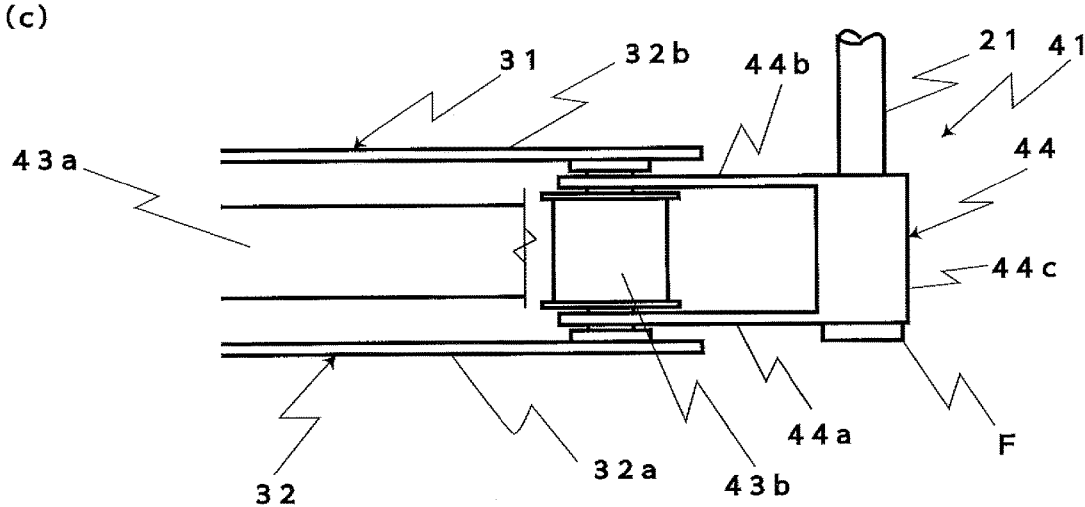

As shown in FIG. 8, the sun gear 5 is set to the top-front of the central rising & falling shaft 3C stood on the center of the base 100. More concretely, a rear shaft 5a of the sun gear 5 projected backward is set to a bearing (not shown) arranged to the central rising & falling shaft 3C. On the other hand, a front shaft 5b of the sun gear 5 projected forward is fixed to the main tilting element 31, thereby the main tilting element 31 is able to be tilted around the front shaft 5b as tilting center.

The central rising & falling shaft 3C has a connecting element connecting to the carrying element 120 at the bottom thereof, and has a connecting part connecting to the rear shaft 5a of the sun gear 5 set to the main tilting part 30 at the top thereof as described above. It is preferable that the central rising & falling shaft 3C is hollow in view of light-weight of the robot R. Herein, a reinforcing rib 3Ca is provided to the front-bottom of the central rising & falling shaft 3C in order to prevent the central rising & falling shaft 3C from bending forward when the central rising & falling shaft 3C is loaded.

As shown in FIG. 8, the right-side planetary gear 6R is set to the top of the right-side rising & falling shaft 3R stood at the right-side of the central rising & falling shaft 3C stood on the base 100. More concretely, a rear shaft 6Ra of the right-side planetary gear 6R projected backward is rotatably set to the top of the right-side rising & falling shaft 3R. On the other hand, the bottom of the front shaft 6Rb of the right-side planetary gear 6R projected forward is rotatably set to the main tilting element 31. Also, the top of the front shaft 6Rb is connected to a driving pulley 43 of the right-side timing belt mechanism 42 so as to be rotated integrally with the driving pulley 43.

The right-side rising & falling shaft 3R is, for example, an electric cylinder including a right-side rising & falling body 3Ra, and a right-side actuator 3Rb rising and falling the right-side rising & falling shaft 3R. Bottom of an outer casing of the right-side rising & falling body 3Ra is tiltably connected to a connecting part 121 arranged on the carrying element 120. For example, the bottom of the outer casing of the right-side rising & falling body 3Ra is connected by pin-joint. Also, the right-side actuator 3Rb rising and falling the right-side rising & falling shaft 3R is connected to the right-side rising & falling body 3Ra so as for the right-side rising & falling body 3Ra is to be tilted.

As shown in FIG. 8, the left-side planetary gear 6L is set to the top of the left-side rising & falling shaft 3L stood at the left-side of the central rising & falling shaft 3C stood on the base 100. More concretely, a rear shaft 6La of the left-side planetary gear 6L projected backward is rotatably set to the top of the left-side riding & falling shaft 3L. On the other hand, the bottom of the front shaft 6Lb of the left-side planetary gear projected forward is rotatably set to the main tilting element 31. Also, the top of the front shaft 6Lb is connected to a driving pulley 47 of the left-side timing belt mechanism 46 so as to be rotated integrally with the driving pulley 47.

The left-side rising & falling shaft 3L, similar to the right-side rising & falling shaft 3R, includes a left-side rising & falling body 3La, and a left-side actuator 3Lb rising and falling the left-side rising & falling shaft 3L. Bottom of an outer casing of the left-side rising & falling body 3La is tiltably connected to a connecting part 121 arranged on the carrying element 120. For example, the bottom of the outer casing of the left-side rising & falling body 3La is connected by pin-joint. Also, the left-side actuator 3Lb rising & falling the left-side rising & falling shaft 3L is connected to the left-side rising & falling body 3La so as for the left-side rising & falling body 3La is to be rotated.

As is described above, since the central rising & falling shaft 3C has not an actuator, rising and falling of the central rising & falling shaft 3C is carried out by synchronously rising and falling both of the right-side rising & falling shaft 3R and the left-side rising & falling shaft 3L.

The main tilting element 31 is a rectangular box 32, and houses the right-side timing belt mechanism 42 right-side thereof and the left-side timing belt mechanism 46 left-side thereof. As is described above, sun gear 5, the front shaft 6Rb of the right-side planetary gear 6R and the front shaft 6Lb of the left-side planetary gear 6L are connected to the rear face 32a of the box 32. The right-end of the box 32 is equipped with a right-side auxiliary tilting element 44 of the right-side auxiliary tilting section 41 and the left-end of the box 32 is equipped with a left-side auxiliary tilting element 48 of the left-side auxiliary tilting section 45.

Since the right-side auxiliary tilting element 44 and the left-side auxiliary tilting element 48 have the same construction except that they are bilateral symmetry, herein, the right-side auxiliary tilting element 44 is described and the description of the left-side auxiliary tilting element 48 is omitted.

The right-side auxiliary tilting element 44 includes a driven pulley 43b driven by the driving pulley 43 through the timing belt 43a, a rear connecting piece 44a and a front connecting piece 44b connected to the rear shaft and the front shaft of the driven pulley 43b respectively, and a right-arm holding part 44c supported by the rear connecting piece 44a and the front connecting piece 44b. Herein, the rear connecting piece 44a and the front connecting piece 44b are connected to the rear shaft and the front shaft of the driven pulley 43b so that the rear connecting piece 44a and the front connecting piece 44b are rotated together with the driven pulley 43*b*. Also, the front shaft and the rear shaft of the driven pulley 43*b* are rotatably supported by the end of the front part 32*b* and the end of the rear face 32*a* of the box 32 respectively. For example, the front shaft and the rear shaft of the driven pulley 43*b* are rotatably supported through bearings. It is preferable that the timing belt 43*a* is provided with a tension adjuster in order to prevent the timing belt 43*a* from loosing. It is preferable that any known structure is able to be adopted as the tension adjuster. Namely, there is no limitation to the construction of the tension adjuster.

The right-arm holding part 44*c* has a through-hole formed back and forth direction for the right-side arm element 21 to be inserted.

The right-side arm element 21 is a hollow cylinder of which length is adjusted so that the right-side arm element 21 is projected forward from the robot R at prescribed distance, and a brim is formed at the rear end thereof to prevent the right-side arm element 21 from slipping off. Also, the left-side arm element 22 has similar construction and is formed a brim at the rear end thereof.

Such construction is acceptable for the right-side arm element 21 and the left-side arm element 22. However, as shown in the drawings, it is preferable that the right-side arm element 21 is inserted so as to be moved freely backward and forward and that stopping groove 21*a* is ring-likely formed about midway thereof. The right-arm holding part 44*c* of the right-side auxiliary tilting element 44 is provided with a locking piece of a locking mechanism, for example, a latch locking mechanism F to be entered into the groove 21*a* so that the right-side arm element 21 is locked. The right-side arm element 21 and the left-side arm element 22 are constructed as such, it becomes easy for the right-side arm element 21 and the left-side arm element 22 are inserted into holding parts 61 of a custom care sheet 60 described later.

Since the tilting block M3 is constructed as such, for example, the right-side of the main tilting part 30 is tilted up by synchronously raising the right-side rising & falling shaft 3R and falling the left-side rising & falling shaft 3L. Namely, the main tilting element 31 is inclined right-side up. In this case, since the right-side planetary gear 6R and the left-side planetary gear 6L are rotated, and the right-side planetary gear 6R and the left-side planetary gear 6L are held by the rear face 32*a* of the box 32 composing the main tilting element 31, the right-side planetary gear 6R and the left-side planetary gear 6L are rotated in the same direction. As a result, the right-side auxiliary tilting element 44 of the right-side auxiliary tilting section 41 is raised and the left-side auxiliary tilting element 48 of the left-side auxiliary tilting section 45 is lowered (refer to FIG. 3). Namely, inclination of the custom care sheet 60 described below held by the right-side arm element 21 and the left-side arm element 22 makes large despite the small inclination of the main tilting part 30.

Figure 9:
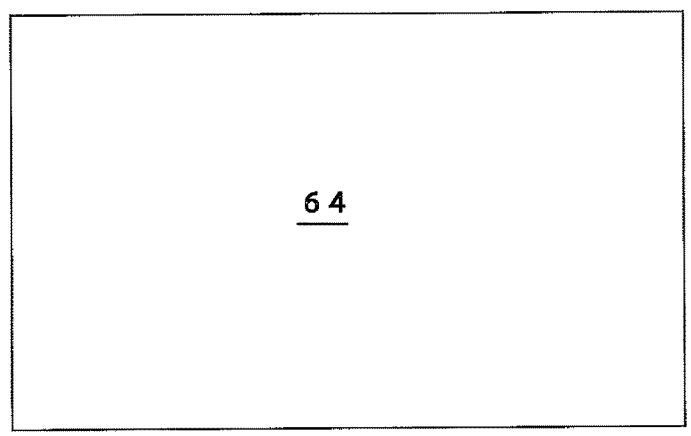
FIG. 9 is a schematic drawing of a custom care sheet.
Figure 9:
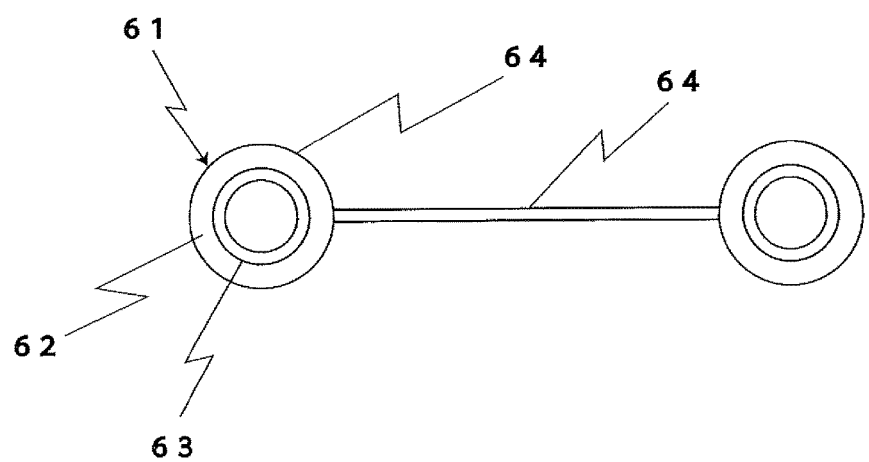

FIG. 9 shows one example of the custom care sheet 60.

As shown in FIG. 9, the custom care sheet 60 has cylindrical holding parts 61 at both end thereof. The right-side arm element 21 of the robot R is inserted into one of the holding part 61 and the left-side arm element 22 of the robot R is inserted into the other of the holding part 61.

The holding part 61 comprises a base layer 62, a cushion layer 63 made of cushioned material arranged outside of the base layer 62 and a surface layer 64 made of synthetic resin sheet.

Figure 10:
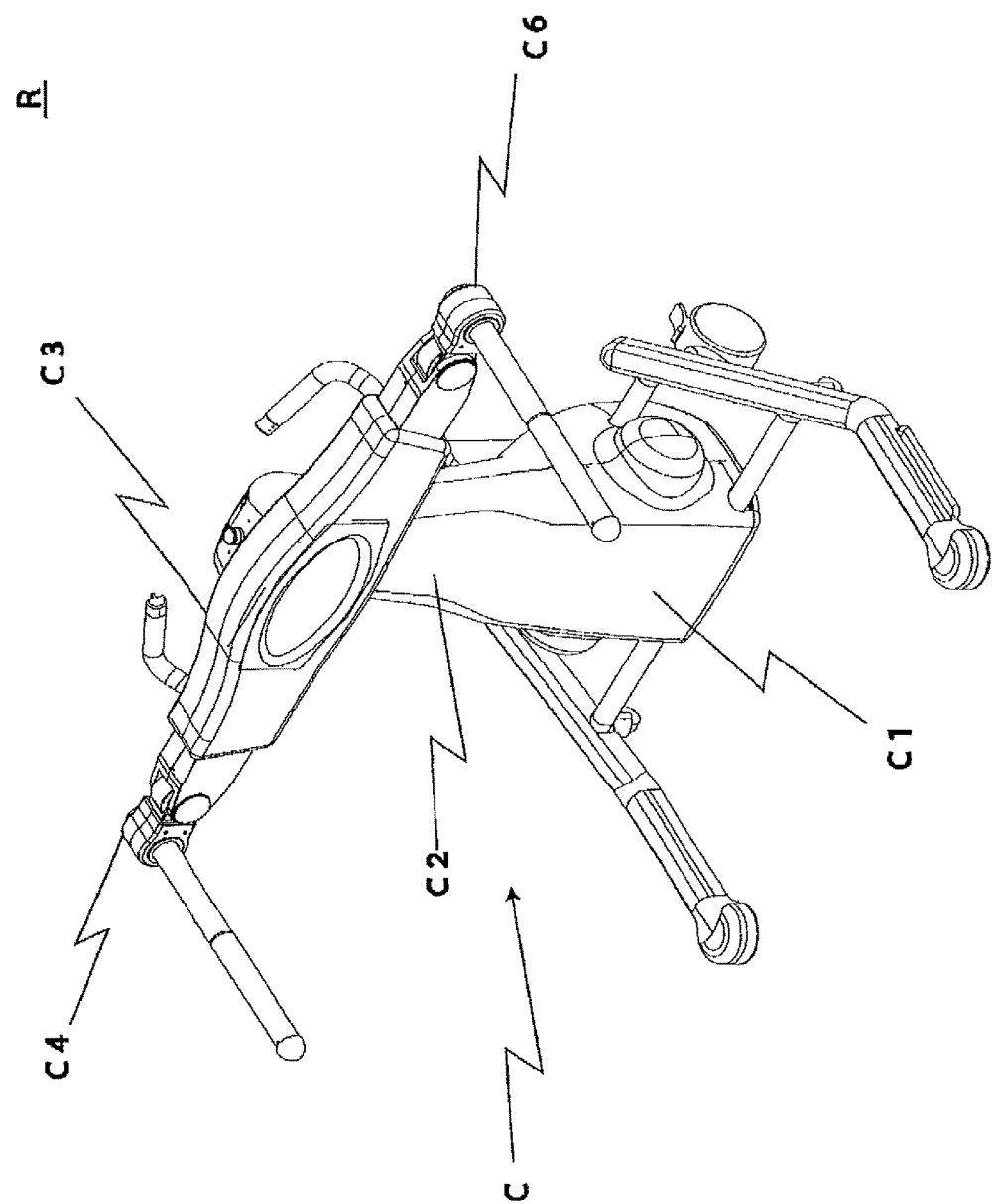
FIG. 10 is an isometric view of the robot covered by a decorative cover.

FIG. 10 shows the robot R is covered with a decorative cover.

The decorative cover C includes a base cover C1 covering the base 100, a body cover C2 covering the central rising & falling shaft 3C, the right-side rising & falling shaft 3R and the left-side rising & falling shaft 3L, a main tilting element cover C3 covering the main tilting element 31, a right-side auxiliary tilting section cover C4 covering the right-side auxiliary tilting section 41, and a left-side auxiliary tilting section cover C6 covering the left-side auxiliary tilting section 45.

According to the robot R constructed as such, the right-side arm element 21 is inserted into one of the holding parts 61 and the left-side arm element 22 is inserted into the other of the holding parts 61 of the custom care sheet 60 on which a care receiver is laid, and then the robot R is moved backward in condition that the care receiver is raised above the bed by raising the right-side rising & falling shaft 3R and the left-side rising & falling shaft 3L synchronously. Thereafter, the main tilting element 31 is tilted so as for the head of the care receiver is moved upward, and then the care receiver is transferred to a wheelchair by the caregiver keeping such posture. Namely, the care receiver is able to be transferred to a wheelchair by one caregiver alone.

Next the operating block M4 is described in detail.

Figure 11:
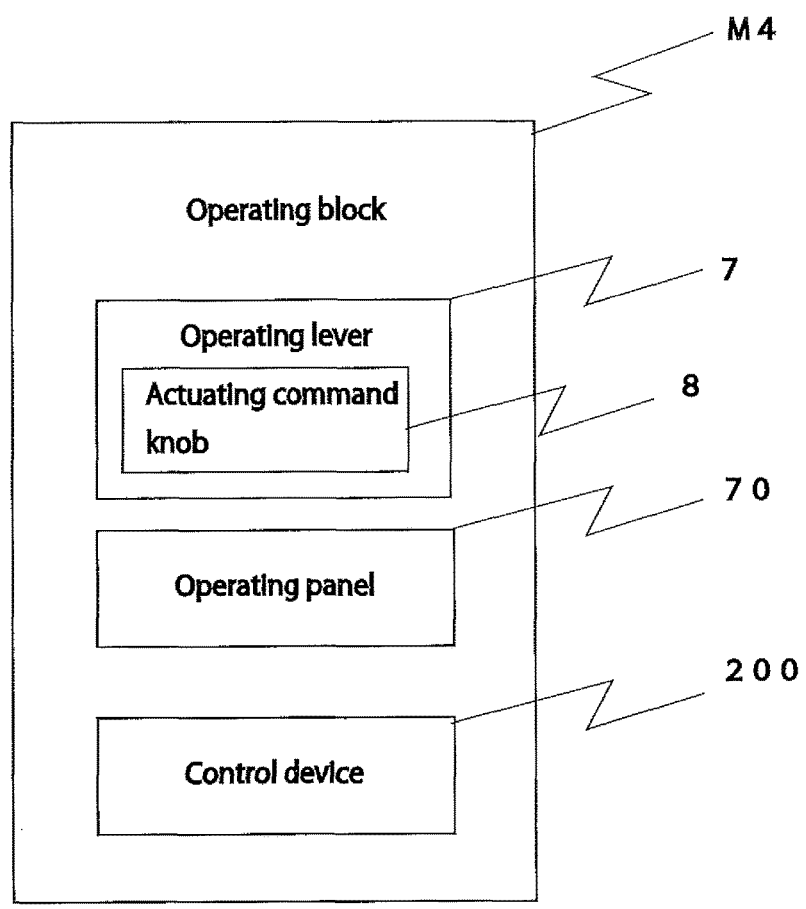
FIG. 11 is a functional block diagram of the operating block of one embodiment of the robot of the present invention.

As shown in FIG. 11, the operating block M4 includes an operating levers 7, an operating panel 70, and a control device 200.

The operating lever 7 has an actuating command knob (actuating command means generating actuating command) 8 at the front end thereof which generates actuating command for rising & falling shafts 3.

More concretely, the operating levers 7 includes a right-side lever 7R set at the right-side of the tilting block M3, and a left-side lever 7L set at the left-side of the tilting block M3. The front end of the right-side lever 7R is provided with an actuating command knob 8 generating actuating command, i.e. a right-side knob 8R, and the front end of the left-side lever 7L is provided with an actuating command knob 8 for actuating command means generating actuating command, i.e. a left-side knob 8L (refer to FIG. 4 to FIG. 7). The right-side knob 8R and the left-side knob 8L generate input signals for a signal input block 210 of the control device 200.

Herein, one example of the input signals generated by the right-side knob 8R and the left-side knob 8L is roughly described.

When the right-side knob 8R and the left-side knob 8L are turned opposite you (upward) simultaneously, raising commands for the right-side rising & falling shaft 3R and the left-side rising & falling shaft 3L in proportion to revolution quantity. Namely, raising commands to increase raising speed for the right-side rising & falling shaft 3R and the left-side rising & falling shaft 3L are generated as increase of revolution quantity. To the contrary, when the right-side knob 8R and the left-side knob 8L are turned toward you (downward) simultaneously, falling commands for the right-side rising & falling shaft 3R and the left-side rising & falling shaft 3L in proportion to revolution quantity. Namely, falling commands to increase falling speed for the right-side rising & falling shaft 3R and the left-side rising & falling shaft 3L are generated as increase of revolution quantity. Stopping raising or falling, the right-side knob 8R and the left-side knob 8L are turned to the zero points respectively. Herein, turning to the zero points are automatically made by springs arranged inside of the knobs.

It is described later for a case in which there is difference between the revolution quantity of the right-side knob 8R and the revolution quantity of the left-side knob 8L.

In a condition that the head of a care receiver is positioned the right-side, the right-side knob 8R is turned opposite you (upward), while the left-side knob 8L is turned toward you (downward), and then a raising command for the right-side rising & falling shaft 3R is generated in proportion to revolution quantity, while a falling command for the left-side rising & falling shaft 3L is generated in proportion to revolution quantity. In an opposite case, the reverse commands are generated. Stopping tilting, the right-side knob 8R and the left-side knob 8L are turned to the zero points respectively.

It is described later for a case in which there is difference between the absolute value of the revolution quantity of the right-side knob 8R and the absolute value of the revolution quantity of the left-side knob 8L.

Figure 12:
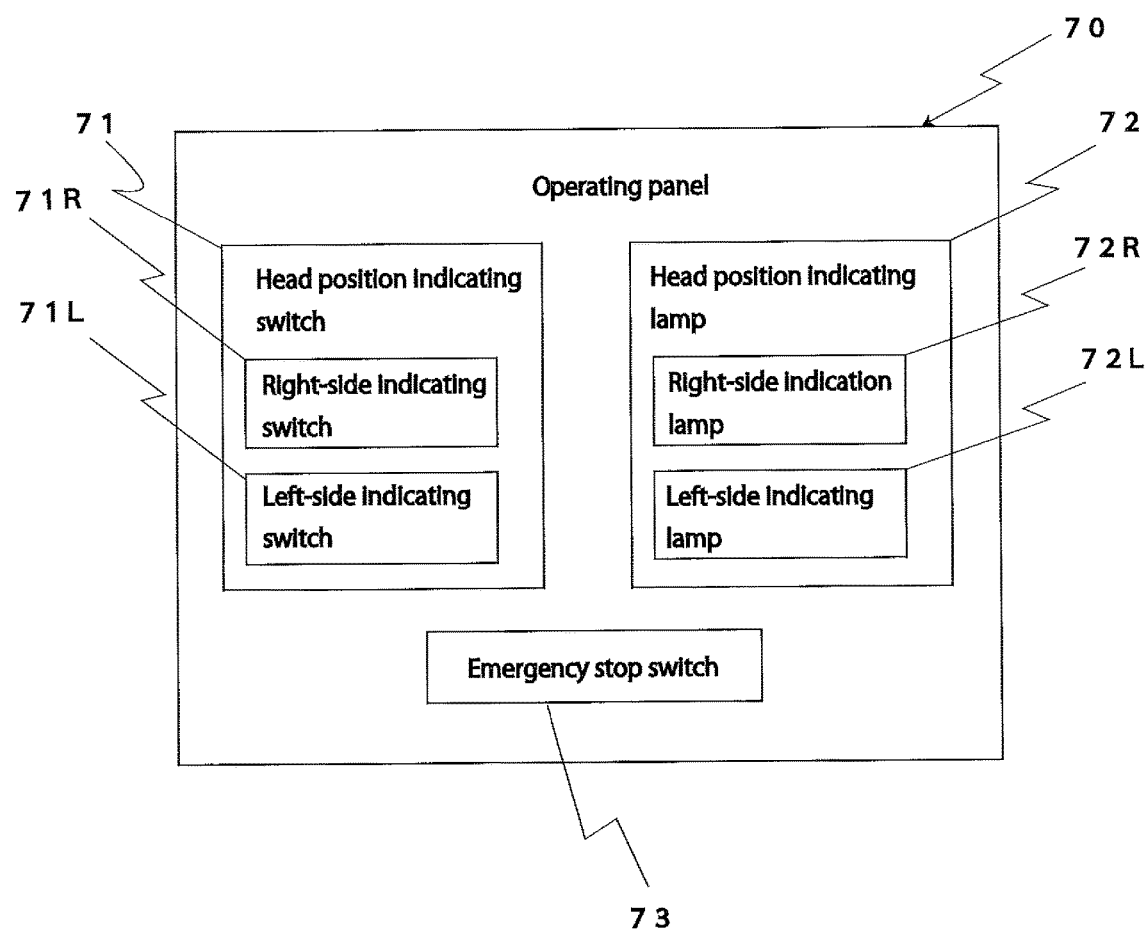
FIG. 12 is a schematic plan view of the operating panel of the operating block.

As shown in FIG. 12, the operating panel 70 includes a head position indicating switches (head position indicating means) 71 indicating position of a head, head position indicating lamps (head position indicating displays) 72 displaying position of the head in response to an indicating signal from the head position indicating switch (the head position indicating means) 71, an emergency stop switch 73. The head position indicating switches 71 include a right-side indicating switch 71R indicating that the head is positioned at the right-side, and a left-side indicating switch 71L indicating that the head is positioned at the left-side. The head position indicating lamps 72 include a right-side indicating lamp 72R indicating that the head is positioned at the right-side, and a left-side lamp 72L indicating that the head is positioned at the left-side. Herein, the head position indicating switches 71, namely the right-side indicating switch 71R and the left-side indicating switch 71L generate input signals for the signal input block 210 of the control device 200.

Herein, a circuit of the right-side indicating switch 71R and left-side indicating switch 71L is made so that the other is turned off when one of them is turned on.

Figure 13:
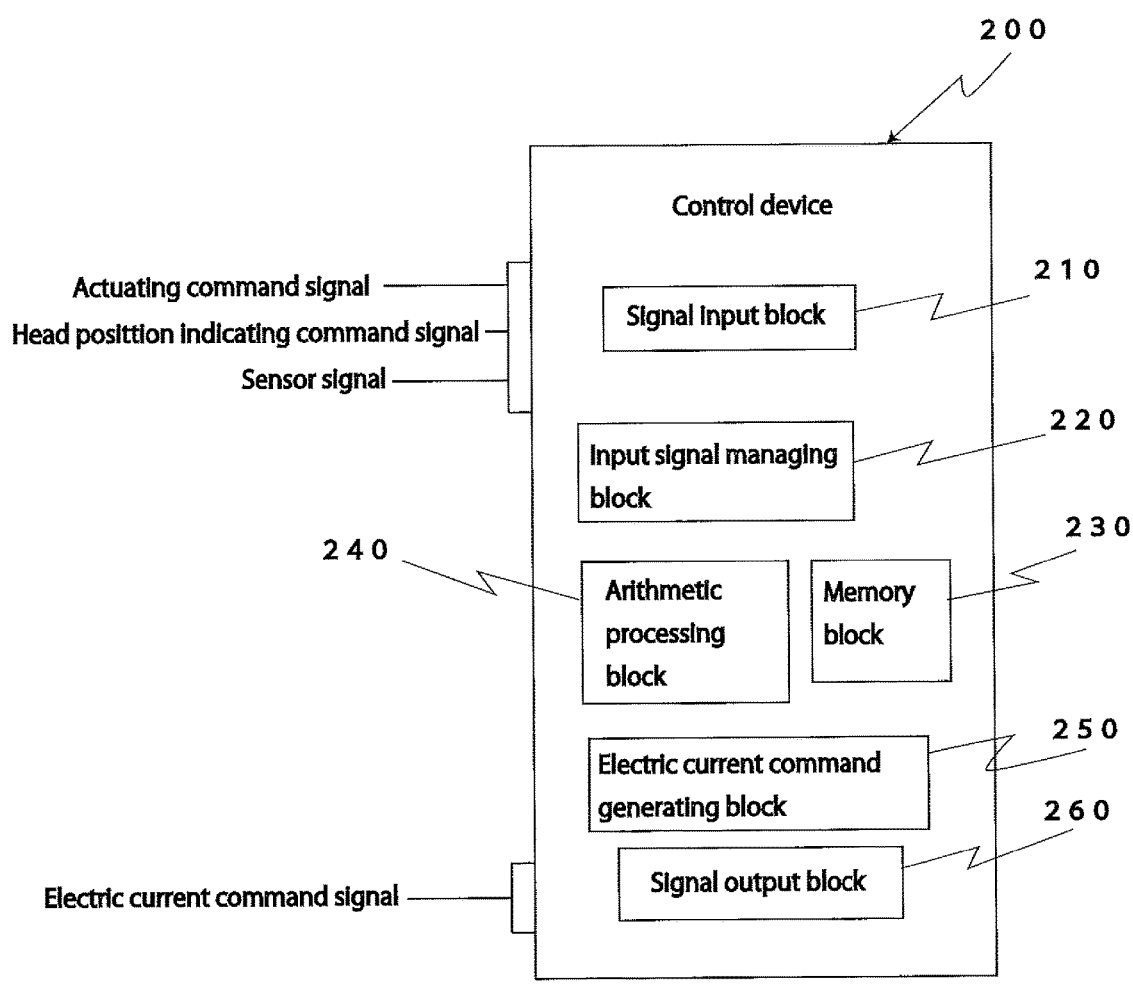
FIG. 13 is a block diagram of the control device of the operating block.
Figure 14:
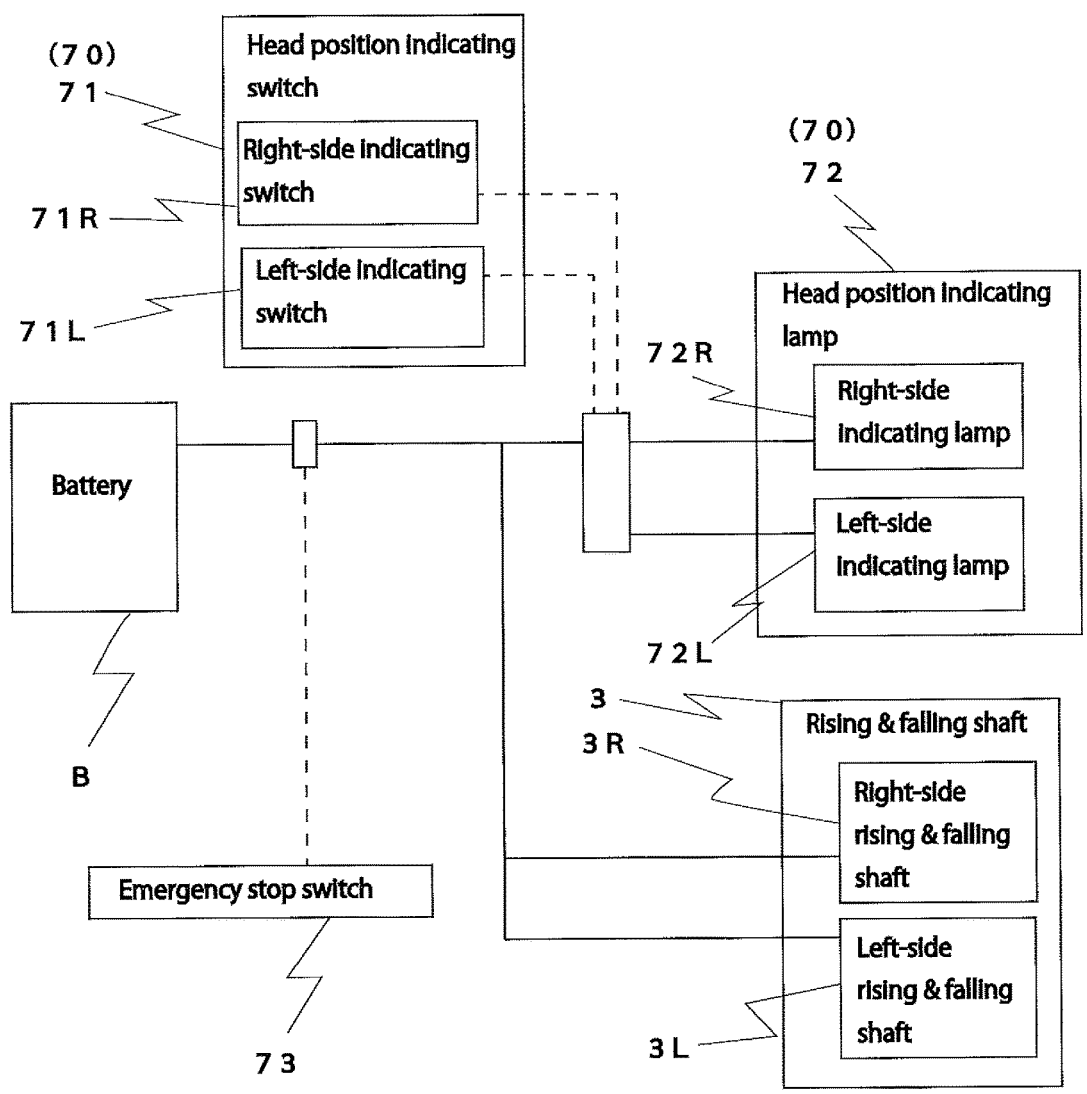
FIG. 14 is a circuit diagram of the operating block.

As shown in FIG. 13, the control device 200 is provided with the signal input block 210, an input signal managing block 220, a memory block 230, an arithmetic processing block 240, an electric current command generating block 250, and a signal output block 260 as main components. The control device 200 constructed as such is composed of a microcomputer installed programs performing functions described later. A circuit of the control device 200 is shown in FIG. 14.

Signals from the actuating command knobs (the actuating command means) 8 generating actuating commands for rising & falling shafts 3 set to the robot R, the switches 71, and the acceleration sensor (acceleration detecting means) are inputted into the signal input block 210, and then inputted signals are outputted to the input signal managing block 220 and/or the memory block 230.

Herein, the acceleration sensor is a three dimensional sensor. However, the acceleration sensor is not limited to the three dimensional sensor, any sensor which calculates at least tilt angle of the tilting block M3 based on acceleration thereof is acceptable. The three dimensional sensor, not shown in the drawings, is set on the center of the top of the main tilting element 31.

Figure 15:
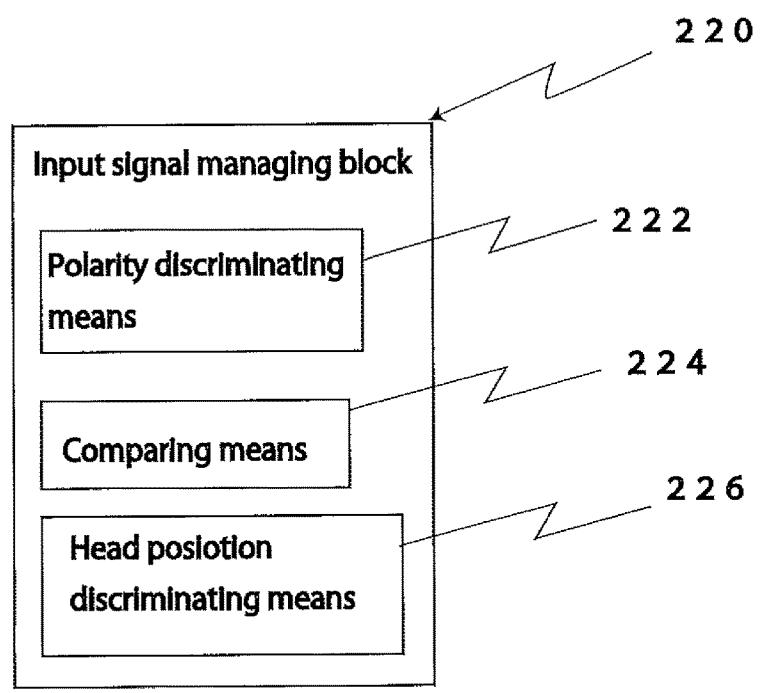
FIG. 15 is a block diagram of the input signal managing block.

The input signal managing block 220 manages input signals inputted from the signal input block 210 and outputs the signals to the arithmetic processing block 240. As shown in FIG. 15, the input signal managing block 220 has polarity discriminating means 222 discriminating the polarity of the actuating command, and comparing means 224 comparing the amplitude of the absolute value of the actuating command and deciding the actuating command output to the arithmetic processing block 240, and head position discriminating means 226 discriminating head position.

The polarity discriminating means 222 discriminates the polarity of the actuating commands from the right-side knob 8R and the left-side knob 8L, and decides raising or falling of the right-side rising & falling shaft 3R and the left-side rising & falling shaft 3L, thereafter the polarity discriminating means 222 outputs the decision to the arithmetic processing block 240.

For example, when both of the polarity of the actuating commands from the right-side knob 8R and the left-side knob 8L are plus, the polarity discriminating means 222 outputs raising commands for the right-side rising & falling shaft 3R and the left-side rising & falling shaft 3L. To the contrary, when both of the polarity of the actuating commands from the right-side knob 8R and the left-side knob 8L are minus, the polarity discriminating means 222 outputs falling commands for the right-side rising & falling shaft 3R and the left-side rising & falling shaft 3L.

When the polarity of the actuating command from the right-side knob 8R is plus and the polarity of the actuating command from the left-side knob 8L is minus, the polarity discriminating means 222 outputs a raising command for the right-side rising & falling shaft 3R, while the polarity discriminating means 222 outputs a falling command for the left-side rising & falling shaft 3L. To the contrary, when the polarity of the actuating command from the right-side knob 8R is minus and the polarity of the actuating command from the left-side knob 8L is plus, the polarity discriminating means 222 outputs a falling command for the right-side rising & falling shaft 3R, while the polarity discriminating means 222 outputs a raising command for the left-side rising & falling shaft 3L.

The comparing means 224 compares the amplitude of absolute value of the actuating command from the right-side knob 8R and the amplitude of absolute value of the actuating command from the left-side knob 8L, and then outputs the small one as the actuating command (the decided actuating command). Therefore, when either the actuating command from the right-side knob 8R or the actuating command from the left-side knob 8L is not inputted, rising & falling or tilting are not carried out because the decided actuating command becomes zero. As a result, the operation is carried out safely.

The head position discriminating means 226 discriminates that the head position is the right-side or the left-side based on a signal from the head position indicating switch 71, and then the decision is outputted to the arithmetic processing block 240. Namely, the head position discriminating means 226 outputs a command indicating the head is the right-side based on the signal from the right-side indicating switch 71R to the arithmetic processing block 240, and the head position discriminating means 226 outputs a command indicating the head is left-side based on the signal from the left-side indicating switch 71L to the arithmetic processing block 240.

The memory block 230 stores signals from the signal input block 210 and date for range of movement of the tilting block M3.

The arithmetic processing block 240 processes based on signals inputted from the input signal managing block 220 and data stored in the memory block 230, thereafter the arithmetic processing block 240 outputs the result to the electric current command generating block 250, for example, as command for speed.

Figure 16:
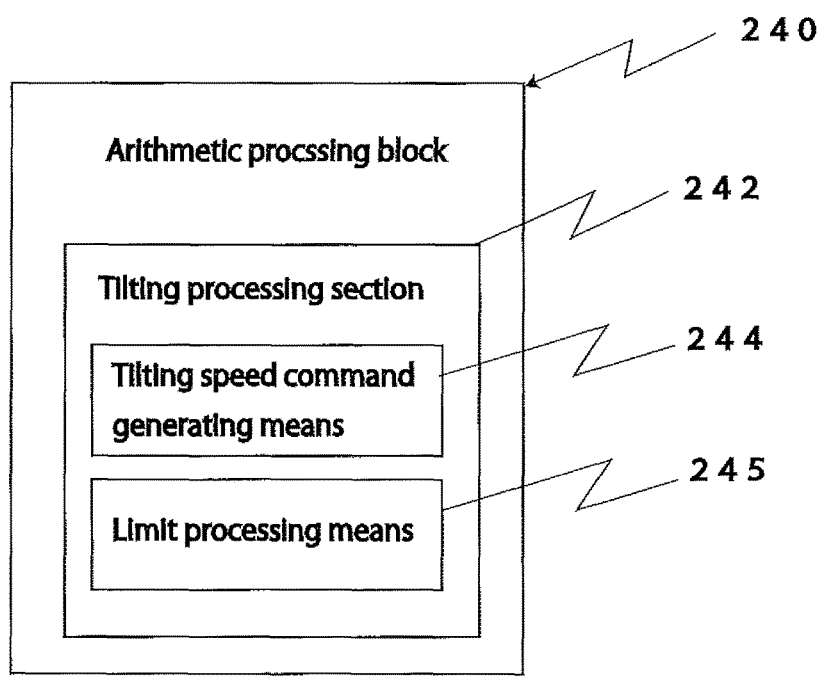
FIG. 16 is a block diagram of the arithmetic processing block.

Hereinafter, additionally referring to FIG. 16, the arithmetic processing block 240 is described in detail.

The arithmetic processing block 240 includes a tilting processing section 242. The arithmetic processing block 240 outputs the processed raising or falling speed to the electric current command generating block 250, for example, as command for speed.

The tilting processing section 242 having tilting speed command generating means (tilting command generating means) 244 and limit processing means 245 processes the following arithmetic processing:

A head raising processing case when the head is positioned at the right-side:

The tilting speed command generating means 244 generates speed commands corresponding to the decided actuating commands for the right-side rising & falling shaft 3R (raising) and the left-side rising & falling shaft 3L (falling) when the tilting speed command generating means 244 discriminates the polarity of the actuating command from the right-side knob 8R is plus, and the polarity of the actuating command from the left-side knob 8L is minus, namely, when a raising command is generated for the rising & falling shaft 3 positioned at the head-side.

The limit processing means 245 performs limiting processing for the speed command signal generated by the tilting speed command generating means 244 as follows:

First, calculates increased angle by processing the signal from the acceleration sensor. Next, discriminates as to whether the calculated angle is within the permissible range or not. Limit processing is made for the speed command signal when the calculated angle exceeds the permissible range. Namely, cuts the upper part of the speed command signal so as for the tilting angle not to exceed the permissible range. However, tilting is stopped when the right-side rising & falling shaft 3R is raised to the upper limit in spite of the tilting angle being within the permissible range.

When the head is positioned at the left-side, the reverse processing is made.

A head falling processing case when the head is positioned at the right-side:

The tilting speed command generating means 244 generates speed commands corresponding to the decided actuating commands for the right-side rising & falling shaft 3R (falling) and the left-side rising & falling shaft 3L (raising) when the tilting speed command generating means 244 discriminates the polarity of the actuating command from the right-side knob 8R is minus, and the polarity of the actuating command from the left-side knob 8L is plus, namely, when a falling command is generated for the rising & falling shaft 3 positioned at the head-side.

The limit processing means 245 performs limiting processing for the speed command signal generated by the tilting speed command generating means 244 as follows:

First, calculates decreased angle by processing a signal from the acceleration sensor. Next, discriminates as to whether the calculated angle is within the permissible range or not. Limit processing is made for the speed command signal when the calculated angle exceeds the permissible range. Namely, cuts the upper part of the speed command signal so as for the tilting angle not to exceed the permissible range. However, tilting is stopped when the right-side rising & falling shaft 3R is fallen to the lower limit in spite of the tilting angle being within the permissible range.

When the head is positioned at the left-side, the reverse processing is made.

The electric current command generating block 250 generates electric current commands for the right-side rising & falling shaft 3R and the left-side rising & falling shaft 3L based on the speed command signals from the arithmetic processing block 240, and then outputs them to the signal output block 260. Herein, generation of the electric current commands are made by known method using the necessary data for generation of electric current commands stored in the memory block 230.

According to the present embodiment, since the tilting block M3 is tilted by simple handling of only turning the right-side knob 8R set at the front end of the right-side operating lever 7R and the left-side knob 8L set at the front end of the left-side operating lever 7L, caregivers are not required to lift up care receivers from beds and the burden of caregivers are lightened. For example, the lower back pain so-called the occupational disorder is got rid of.

The present invention is described referring to the specific embodiment, however, the scope of the present invention is not limited to the specific embodiment, and numerous variants are possible.

For example, the auxiliary tilting elements 44, 48 are tilted by the timing belt mechanism 42, 46. The auxiliary tilting elements 44, 48 may be tilted by a chain mechanism.

Also, the actuating command means for the rising & falling shaft 3 are not limited to the embodiment, and numerous variants are possible. For example, the actuating command means for the rising & falling shaft 3 are not limited to the knob 8R arranged at the front end of the right-side lever 7R, and the knob 8L arranged at the front end of the left-side lever 7L, and any type of signal input means is acceptable. Also, any suitable setting position of the signal input means is acceptable. It is possible for a force sensor to be joined the signal input means.

INDUSTRIAL APPLICABILITY

The present invention is applicable for use in the care business and the robot industry.

Symbol
R Robot
M1 Movable block
M2 Rising & falling block
M3 Tilting block
M4 Operating block
B Battery
C Decorative cover
F Latch locking mechanism
2 Tilting element
3 Rising & falling shaft
3C Central rising & falling shaft
3Ca Reinforcing rib
3R Right-side rising & falling shaft
3Ra Right-side rising & falling body
3Rb Right-side actuator
3L Left-side rising & falling shaft
3La Left-side rising & falling body
3Lb Left-side actuator
4 Planetary gear unit
5 Sun gear
5a Rear shaft
5b Front shaft
6R Right-side planetary gear
6Ra Rear shaft
6Rb Front shaft
6L Left-side planetary gear
6La Rear shaft
6Lb Front shaft
7 Operating lever 7R Right-side lever
7L Left-side lever
8 Actuating command knob
8R Right-side knob
8L Left-side knob
20 Arm element
21 Right-side arm element
21a Groove
22 Left-side arm element
30 Main tilting part
31 Main tilting element
32 Box
32a Rear face
40 Auxiliary tilting part
41 Right-side auxiliary tilting section
42 Right-side timing belt mechanism
43 Driving pulley
43a Timing belt
43b Driven pulley
44 Right-side auxiliary tilting element
44c Right-arm holding part
45 Left-side auxiliary tilting section
46 Left-side timing belt mechanism
47 Driving pulley
48 Left-side auxiliary tilting element
60 Custom care sheet
61 Cylindrical holding part
62 Base layer
63 Cushion layer
64 Surface layer
70 Operating panel
71 Head position indicating switch (Head position indicating means)
71R Right-side indicating switch
71L Left-side indicating switch
72 Head position indicating lamp (Head position indicating display)
72R Right-side indicating lamp
72L Left-side indicating lamp
73 Emergency stop switch
100 Base
110 Carrying block
120 Carrying element
121 Connecting part
130 Horizontal support element
160 Moving mechanism
170 Front moving mechanism
171 Front wheel
172 Front wheel support element
173 Horizontal part
174 Upslope part
175 Front wheel support element holding element
180 Middle moving mechanism
181 Middle wheel
182 Middle wheel support element
190 Rear moving mechanism
191 Rear wheel
192 Rear wheel support element
200 Control device
210 Signal input block
220 Input signal managing block
222 Polarity discriminating means
224 Comparing means
226 Head position discriminating means
230 Memory block
240 Arithmetic processing block
242 Tilting processing section
244 Tilting speed command generating means
245 Limit processing means
250 Electric current command generating block
260 Signal output block

The invention claimed is:

1. A robot comprising:
a movable block;
a rising & falling block arranged on the movable block;
a tilting block set to the rising & falling block;
an operating block arranged on the tilting block; and
a pair of arms, wherein the tilting block has a main tilting part and an auxiliary tilting part arranged on the main tilting part;
the main tilting part having a main tilting element with opposing ends, the main tilting element part being rotatable relative to the rising & falling block about a tilting axis; and
the auxiliary tilting part has auxiliary tilting elements, holding the arms, rotatably set at the opposing ends of the main tilting element of the main tilting part respectively, wherein the auxiliary tilting elements are configured to move relative to the main tilting element in response to a rotation of the main tilting element about the tilting axis.

2. The robot according to claim 1,
wherein the main tilting part has a planetary gear mechanism including a sun gear and a pair of planetary gears arranged symmetrically to the sun gear;
the sun gear is supported by a top of a central rising & falling shaft of the rising & falling block and the main tilting element of the main tilting part in condition that the sun gear is unable to be rotated;
a first planetary gear of the planetary gears is supported by a top of a first-side rising & falling shaft, which is set at a first side of the central rising & falling shaft tiltably set on the base and at a first side of the main tilting element of the main tilting part, in condition that the first planetary gear is able to be rotated; and
a second planetary gear of the planetary gears is supported by a top of a second-side rising & falling shaft, which is set at a second side of the central rising & falling shaft tiltably set on the base and at a second side of the main tilting element of the main tilting part, in condition that the second planetary gear is able to be rotated.

3. The robot according to claim 2, wherein the auxiliary tilting element is rotated in a same direction as the rotation of the main tilting element.

4. The robot according to claim 1, wherein the rising & falling block has a pair of rising & falling shafts by which the main tilting element is tilted.

5. The robot according to claim 1, wherein each of the auxiliary tilting elements of the auxiliary tilting part is tilted relative to the main tilting element by a rotating force of a planetary gear through a force transmitting mechanism arranged in the main tilting element.

6. The robot according to claim 5, wherein the force transmitting mechanism is a timing belt mechanism.

7. The robot according to claim 1, wherein each of the arms is a solid cylinder or a hollow cylinder.

8. The robot according to claim 1, wherein the arms are supported by the auxiliary tilting elements in condition that the arms are able to be moved forward and backward.

9. The robot according to claim 8, wherein each of the auxiliary tilting elements has a locking mechanism which locks a respective one of the arms at a prescribed position.

10. The robot according to claim 1, wherein the robot is covered with a decorative cover.

11. The robot according to claim 1, the operating block further comprising operating levers, an operating panel, and a control device; wherein the operating levers have actuating command means generating actuating command for the rising & falling block.

12. The robot according to claim 11, wherein the operating panel has a head position indicating means indicating a position of a head of a care receiver supported by the robot, and a head position indicating display displaying the position of the head in response to an indication signal from the head position indicating means.

13. The robot according to claim 11, the control device further comprising a signal input block, an input signal managing block, an arithmetic processing block, a driving command generation block and a signal output block; wherein the arithmetic processing block has a tilting processing section which has a tilting command generation means and a limit processing means.

14. The robot according to claim 13, wherein the limit processing means calculates the tilting angle based on the acceleration.

15. The robot according to claim 13, the input signal managing block further comprising a polarity discriminating means discriminating the polarity of the actuating command, a comparing means comparing the amplitude of the actuating command and a head position discriminating means discriminating the position of the head based on a signal from the head position indicating means.

16. The robot according to claim 15, wherein the comparing means selects a smaller absolute value of the input signal.

17. The robot according to claim 1, wherein the auxiliary tilting elements rotate relative to the main tilting element about auxiliary tilting axes, and the auxiliary tilting axes are parallel to the tilting axis.

* * * * *